US006949600B2

(12) United States Patent
Schierlmann

(10) Patent No.: US 6,949,600 B2
(45) Date of Patent: Sep. 27, 2005

(54) ALUMINA FILLED WOOD FINISH COMPOSITION

(75) Inventor: John Schierlmann, Hickory, NC (US)

(73) Assignee: The Flecto Company, Inc., Oakland, CA (US)

( * ) Notice: Subject to any disclaimer, the term of this patent is extended or adjusted under 35 U.S.C. 154(b) by 472 days.

(21) Appl. No.: 09/900,257

(22) Filed: Jul. 6, 2001

(65) Prior Publication Data

US 2003/0017269 A1 Jan. 23, 2003

(51) Int. Cl.[7] .................................................. C08K 3/18
(52) U.S. Cl. ....................................... 524/430; 524/437
(58) Field of Search ................................. 524/430, 437

(56) References Cited

U.S. PATENT DOCUMENTS

| | | | | |
|---|---|---|---|---|
| 5,095,046 A | | 3/1992 | Tse | |
| 5,376,503 A | | 12/1994 | Audett et al. | |
| 5,708,039 A | | 1/1998 | Daly et al. | |
| 6,017,640 A | | 1/2000 | Muthiah et al. | |
| 6,133,342 A | | 10/2000 | Mizobuchi et al. | |
| 6,210,472 B1 | * | 4/2001 | Kwan et al. | 106/31.14 |
| 6,387,519 B1 | * | 5/2002 | Anderson et al. | 428/447 |

* cited by examiner

*Primary Examiner*—Edward J. Cain
(74) *Attorney, Agent, or Firm*—Fay, Sharpe, Fagan, Minnich & McKee, LLP

(57) ABSTRACT

In an exemplary embodiment of the present invention, a coating composition for wood products including urethane polymers and fumed alumina is provided.

In another exemplary embodiment of the present invention, a method for improving the abrasion resistance of a wood coating composition is provided. The method includes mixing urethane polymers and fumed alumina to form a wood coating composition.

18 Claims, No Drawings

ALUMINA FILLED WOOD FINISH COMPOSITION

BACKGROUND OF THE INVENTION

This invention relates to finishing of wood objects. More particularly, the invention relates to a product, and a method of its use, for finishing or refinishing wood floors or furniture.

Hardwood floors have been employed in quality housing and offices for more than 150 years. To improve the ability of the surface of the floor to withstand wear and tear and make it attractive in appearance, the wood is subjected to smoothing and finishing steps.

Wood finish coatings (referred to herein alternatively as a coating and a finish) are required to withstand a great deal of traffic and wear to protect the wood beneath. Common coatings are solvent and/or water based. Polyurethane and acrylic based coatings are the most common in the industry. One important characteristic of a floor finish is scratch and abrasion resistance. To improve such resistance, fillers or extenders have been included in finish compositions. One extender commonly used is aluminum oxide. This method, however, can lead to loss of clarity, curing problems and/or brittleness of the finished coating. A finish including aluminum oxide is often hard and can aid in abrasion resistance if formulated correctly. A primary drawback to the use of aluminum oxide as an extender is the extreme brittleness and milky loss of clarity of the finish.

It would be desirable to develop an extender that is capable, either alone or in combination with additional fillers and extenders, of improving the abrasion and wear resistance of a wood finish while maintaining the desired clarity of the finish and avoiding brittleness.

SUMMARY OF THE INVENTION

In one exemplary embodiment of the present invention, a coating composition including urethane polymers and fumed alumina is provided.

In another exemplary embodiment of the present invention, a method for improving the abrasion resistance of a coating composition is provided. The method includes combining a urethane polymer and a filmed alumina.

In a third exemplary embodiment of the present invention, a method of finishing a wood article is provided. The method includes applying a coating composition that includes a urethane polymer and fumed alumina to the wood article.

DETAILED DESCRIPTION OF THE PREFERRED EMBODIMENTS

While the invention will be described in connection with certain exemplary embodiments, it will be understood that it is not intended to limit the invention to those embodiments. On the contrary, it is intended to cover all alternatives, modifications, and equivalents that may be included within the spirit and scope of the invention defined by the appended claims.

The present invention provides a wood finish with superior abrasion resistance and clarity. Particularly, the present invention is directed to a wood finish including fumed alumina as an extender to improve the abrasion resistance and clarity (relative to aluminum oxide) of the final wood finish. The finish includes principle polymers, fumed alumina, and other additives. The wood finish may be any of gloss, semi-gloss, or satin.

The "principle polymers" are those that are capable of crosslinking (e.g. urethane/acrylic copolymers, aliphatic urethanes, acrylic copolymers, and other polymers containing pendant carboxylic acid groups). Suitable polymers of urethane, acrylic, and urethane/acrylic copolymers (i.e., a polymer containing urethane and acrylic moieties) for use in the compositions of the present invention are those that are capable of forming stable dispersions in water or other solvents (e.g., hydrocarbon based). One specific example of a nonfilm-forming urethane/acrylic copolymer is a high solids, monomer-free, radiation-curable, water-borne urethane/acrylic copolymer, which is commercially available under the trade designation "NeoRad 3709" from NeoResins, a division of Avecia, Wilmington, Mass. Specific examples of urethane and acrylic polymers include NEOREZ R9699 and NEOCRYLX A6092. These urethane/acrylic polymers and copolymers are designed for high performance uses, where hardness, flexibility, UV resistance, and chemical resistance are desired.

In solvent based coating systems, the preferred polymers are urethane polymers. Particularly preferred are high solids oil modified urethanes and conventional oil modified urethanes. The oil may be a byproduct of the reaction of a drying oil, such as linseed, soybean, sunflower, and dehydrated castor oil, with toluene diisocyanate. The high solids oil modified urethanes preferably have a solids content greater than about 75%. Preferred high solids oil modified urethanes include Reichhold F87, (Durham, N.C.), McWhorter 57-5849 (Carpentersville, Ill.), and EPS 4842, (Marengo, Ill.). The conventional oil modified urethane polymers preferably have a solids content less than about 75 wt %. Preferred conventional oil modified urethane polymers include Reichold F-19, McWhorter 43-4305, and EPS 4603.

In water based systems, the preferred polymers are self-crosslinking acrylics and self-crosslinking urethanes. The self crosslinking acrylic is an emulsion with an internal crosslinking agent to promote better performance in film properties. Preferred self crosslinking acrylics include BF Goodrich 720, (Brecksville, Ohio), SC Johnson Joncryl 1972 (Sturtevant, Wis.), and Avecia XK-12. Preferred self-crosslinking urethane polymers include BF Goodrich 4020, and Avecia Neopac 114.

The coating composition of the present invention preferably has a total solids content between about 15 and 80 wt %, more preferably between about 20 and 75 wt %. This total weight percent can be achieved by varying the amounts of high and low solids polymers used in the overall coating composition.

The curable coating composition of the present invention may optionally use a glycol ether as a coalescing aid. The coalescing aid can enhance film formation and increase the flexibility of the coating. The coalescing aid can also function as a wetting agent. Suitable glycol ether coalescing aids are commercially available from The Dow Chemical Company, Midland Mich., under the trade designation Dowanol.

The coalescing aid, or a mixture of coalescing aids, is present in the coating composition in an amount effective to meld the urethane/acrylic particles during the drydown or curing stage and thereby allow a continuous film to form. Preferably, the coalescing aid, or a mixture of such coalescing aids, comprises less than about 15 wt % of the coating composition in an amount based on the weight of polymer solids. More preferably, the coating composition includes about 1–10 wt %, most preferably about 3–8 wt %, coalescing aid, based on the weight of polymer solids.

A crosslinker is optionally included in the curable coating compositions of the present invention to enhance the tensile strength of the cured coating and improve its chemical resistance. Suitable crosslinkers are those that can be used to crosslink urethane/acrylic polymers or copolymers, and are stable in alkaline solutions. Examples of such crosslinkers include, but are not limited to, epoxy silanes, amino silanes, and aziridine derivatives. Suitable epoxy silanes include Z-6040 available from Dow Corning. Suitable aminosilanes include Z 6020 available from Dow Corning. Suitable polyfunctional aziridines are those commercially available under the trade designations XAMA-2 (trimethylolpropane-tris-(β-N-aziridinyl)propionate) and XAMA-7 (pentaerythrito-tris-(β-N-aziridinyl) propionate) from B.F. Goodrich Chemical Company, and NeoCryl CX-100 from Zeneca Resins (Wilmington, Mass.) These crosslinkers are particularly desirable because they also function as adhesion promoters to materials such as polyester, glass, etc. They are preferably used with polymers containing active hydrogens, such as the urethane/acrylic copolymers described above that contain pendant carboxylic acid groups.

The alkaline-stable crosslinker, or mixture of alkaline stable crosslinkers, is present in the coating composition of the present invention in an amount effective to provide a durable cured coating. Preferably, the alkaline-stable crosslinker is present in the coating composition in an amount from about 0.1–10 wt % and more preferably about 0.5–6 wt % based on the weight of the polymer solids.

Alternatively, the coating composition may be photochemically cured. If photochemically cured, the curing reaction is preferably initiated by ultraviolet light and the selected urethane and acrylic polymers can be capable of self-curing.

A thickener may be used in the coating composition to increase the viscosity of the dispersions. This is sometimes important to provide coatings that do not sag. Suitable thickeners are those that are compatible with urethane/acrylic dispersions. As used herein "compatible" means that the component does not cause adverse affects to the curable compositions (e.g. precipitation, flocculation, or other separation of the components), or to the cured coating (e.g. disruption of film continuity, phase separation, or loss of adhesion to the backing). Preferred thickeners are associative thickeners. An "associative" thickener is a polymeric compound having hydrophobic groups that associate with the dispersed polymer particles of the curable coating compositions. This association is believed to result in adsorption of the thickener molecule onto the dispersed polymer particles. Preferred thickeners include RM-825 (Rohm-Haas, Independence Mall West, Philadelphia, Pa.), Rheolate 266 (Rheox, Hightown, N.J.), and DSX 1514 (Cognis Coating, Ambler, Pa.).

Silica flatting agents can be added to the finishes of the present invention to aid in the lowering of gloss, without loss of clarity, in semi-gloss and satin applications. Preferred silica flatting agents are silicon dioxide. The silica flatting agent may also have a synergistic effect on the drying system of both conventional and high solids solvent based urethanes. The preferred silica has a particle size of between about 1 and 15 μm, more preferably a particle size between about 1.5 and 12 μm. Preferred silica flatting agents include Crossfield HP 210 (Joliet, Ill.), Grace C-810 (Columbia, Md.), and Degussa OX-50 (Ridgefield, N.J.). The silica flatting agents preferably comprise about between about 0.1 and 15 wt % of the total composition, more preferably between about 0.3 and 10 wt %. In gloss applications, the finish is substantially free of silica. In semi-gloss applications, the finish preferably includes between about 0.5 and 10 wt % silica. In satin applications, the finish preferably includes between about 2 and 15 wt % silica.

Surfactants may be used in the coating composition to provide smooth, uniform coatings. A wide variety of surfactants, i.e., surface-active agents, are suitable for use in the curable coating compositions of the present invention.

Suitable surfactants include, but are not limited to, flow control agents, wetting agents, dispersants, adhesion enhancers, defoamers, etc. Preferred surfactants are nonionic or anionic. Examples of preferred surfactants are available under the trade designation "Silvet L-7210" (a nonionic polyalkeneoxide modified polydimethylsiloxane) (Osi Specialties, Inc., Danbury, Conn.), "Surfynol 104PA" (2,4,7,9-tetramethyl-5-decyn-4,7-diol) (Air Products and Chemicals, Inc., Allentown, Pa.) and "Triton GR-7M" (an anionic sulfosuccinate) from (Union Carbide Chemicals and Plastics Co., Inc., Danbury, Conn.).

Flow control agents are organic compounds capable of helping the coating wet the substrate and flow over possible contaminations. Preferred flow control agents are sold under the trade names BYK 344 (BYK Chemie, Wallingford, Conn.), Air Products HS-30, and Witco L-7500.

Organic dispersants are hydrocarbon modified surface acting agents with acid or basic functionality designed to aid in the separation of pigment agglomerates. Preferred dispersants include Disperbyk 161 (BYK Chemie).

Organic defoamers are another class of surfactants that may be included in the coating compositions of the present invention. Organic defoamers are hydrocarbon modified liquids, sometimes with silicone modification. The defoamer serves to break bubbles and air entrapment in the system. A preferred defoamer is sold under the trade name BYK-077 (BYK Chemie).

A surfactant, or mixture of surfactants, is present in the coating composition in an amount effective to provide a smooth, uniform coating. Preferably, a surfactant, or mixture of surfactants, is present in the curable coating compositions of the present invention in an amount of about 0.1–5 wt % and more preferably, about 0.5–3 wt %, based on the total weight of the curable coating composition (including solvent or water).

An extender is added to the coating compositions of the present invention to improve the abrasion and scratch resistance of the resulting finish. In addition, the extender preferably lowers the oil absorption of the resulting finish. The preferred extender is fumed alumina. The fumed alumina is lighter than unfumed alumina. Due to the lower density of the fumed alumina, the extender is less likely to sag or reduce the clarity of the cured coating. The preferred fumed alumina can be formed by furnace exposing unfumed alumina to an elevated temperature as known by the skilled artisan. The fumed alumina preferably has a density of less than about 200 $g/cm^3$, more preferably less than about 150 $g/cm^3$. Moreover, the fumed alumina has a smaller particle size than unfumed alumina. The particle size (i.e., maximum particle diameter) of the fumed alumina is preferably less than about 1 μm, more preferably less than about 750 nm, and most preferably less than about 250 nm. The surface area of the fumed alumina is preferably less than about 200 $m^2/g$, more preferably less than about 150 $m^2/g$.

An additional benefit to the use of fumed alumina as an extender is the ability of the fumed alumina to suspend silica as a thixotrope. This suspension capability further lowers gloss while maintaining clarity in the finished product.

The fumed alumina preferably comprises between about 0.1 and 5 wt % of the overall coating composition, more preferably between about 0.1 and 2.5 wt %, and most preferably between about 0.1 and 1.5 wt %.

Additional additives may optionally be included in the coating composition of the present invention. Among these are preservatives, biocides, surface driers, through driers, freeze thaw agents, antiskinning agents, and mixtures thereof.

Preservatives are solutions used to prevent pre-cured corrosion of the coating composition. A preferred preservative is Butrol 35 (Beckman Labs, Memphis, Tenn.).

Biocides are antimicrobial chemicals designed to prevent or eliminate microbe or fungal activity within the coating composition. Preferred biocides include Troy P-20T (East Hanover, N.J.), and Proxel GXL, available from Zeneca.

Surface driers are metal containing solutions used to promote surface drying in unsaturated hydrocarbons containing alkyds. Preferred surface driers include cobalt and manganese solutions.

Through driers are auxiliary driers that work synergistically with the surface driers to promote oxidative curing of the system. Preferred through driers are calcium, aluminum, and zirconium solutions.

Freeze thaw agents are organic chemicals used to prevent the freezing of a latex emulsion by lowering the film formation temperature. Preferred freeze thaw agents include ethylene glycol, diethylene glycol, propylene glycol, and mixtures thereof.

Antiskinning agents are volatile solutions designed to prevent the premature surface cure of a coating. Preferred antiskinning agents include Skino #2 (Huls America, Piscataway, N.J.), and Exkin (Huls America).

Coating compositions including fumed alumina in accordance with the present invention demonstrate improved dry times over coating compositions including other extenders. Dry times have been reduced up to 25% in conventional low solids coatings and as much as 60% in high solids coatings. Lower dry times were especially noticed in solvent-based coatings. The conventional coatings including filmed alumina reduced dry times from 75 minutes of about 45 minutes. The high solids coatings demonstrated dry times reduced from over 7 hours without fumed alumina to about 4.75 hours after the addition of fumed alumina. These reduced dry times allow a floor to be finished in under 24 hours with 3 coats of conventional and/or 2 coats of high solids coatings. Previous coating compositions required much longer dry times, spreading applications over a period of several days. The dry time reduction for water based coatings was not as significant due to the faster dry times of water based coatings as compared to solvent based coatings.

The physical properties enhanced by the incorporation of fumed alumina are the sward hardness, taber abrasion, scratch resistance, and pencil hardness. In addition, film integrity is improved by the addition of fumed alumina as an extender in the coating compositions. Importantly, these improvements were gained without sacrificing the clarity or impact resistance of the coating as occurs with the use of conventional extenders.

The invention has been described with reference to preferred embodiments. The following non-limiting examples and tables are for illustrative purposes only and should not be construed in any limiting sense.

EXAMPLES

Example 1

High Solids Urethane Floor Finish

To a kettle was charged 136 kg (143.2 L) high solids oil modified urethane. The mixer was started and 0.227 kg (0.265 L) organic defoamer (BYK 052), 0.907 kg (0.871 L) organic dispersant (Disperbic 110) and 24.94 kg (32.33 L) solvent (Rule 66 mineral spirits) were added. The components were thoroughly mixed for approximately 5 minutes. After mixing, 4.536 kg (4.43 L) fumed alumina (Cabot CT 1300) was sifted into the mixture. The mixture was agitated at moderate speed until a 6 Hegman. 28.12 kg (13.48 L) silica flatting agent (Syloid CA-12) was sifted into the mixture at high speed for 20 minutes. The mixture was agitated at moderate speed until a 6 Hegman, followed by the addition of an additional 19.95 kg (25.85 L) mineral spirits. 136 kg (149.4 L) conventional oil modified urethane was then added to the mixture. In a separate container, 4.536 kg (5.867 L) Rule 66 mineral spirits solvent, 0.590 kg (0.568 L) Cabot surface drier, 3.18 kg (2.91 L) manganese through drier, 0.227 kg (0.265 L) organic defoamer (BYK 052), 0.454 kg (0.454 L) organic surfactant (BYK 323), 0.680 kg (0.568 L) flow agent (Witco L77), and 1.81 kg (1.97 L) antiskinning agent (Skino #2) were premixed then added to the reaction kettle. The reaction mixture was agitated for an additional 30 minutes.

Example 2

Water Based Urethane Coating Composition

To a kettle was charged 172.5 kg (165.5 L) self crosslinking acrylic (Neores XK-12), 36.5 kg (63.63 L) water, 0.454 kg (0.454 L) defoamer (BYK 028), 0.091 kg (0.0757 L) biocide(Proxel GXL), 175.9 kg (75.67 L) self crosslinking urethane (Neopac E125), and 9.07 kg (9.16 L) wax (Michem 39325). The components were mixed thoroughly.

To a separate kettle was charged 11.34 kg (11.36 L) water, 2.72 kg (2.65 L) freeze thaw agent (propylene glycol), 20.96 kg (22.12 L) hydrophilic solvent(dipropylene glycol monomethyl ether), and 9.99 kg (10 94 L) hydrophobic solvent(dipropylene glycol monobutyl ether). The components were mixed thoroughly. After mixing, 4.54 kg (4.43 L) fumed alumina (Cabot CT 1300) was sifted into the mixture under agitation. The mixture was dispersed to 6 Hegman and 2.72 kg (1.29 L) silica flatting agent (Syloid CA-12) was sifted into the mixture under agitation. After the mixture was again brought to 6 Hegman, 0.68 kg (0.644 L) thickener (DSX-1514), 2.72 kg (2.50 L) level aid (Rohm-Haas RM 1020), 0.272 kg (0.227 L) flow and level aid (Lodyne 228M), 0.907 kg (0.681 L) preservative (Butrol 35), and 11.34 kg (11.36 L) water were added under agitation.

The contents of the second kettle were then charged to the first kettle under agitation.

Sample coating compositions of the present invention were prepared according to the procedures described in Examples 1 and 2. The coatings were then applied to 3 ×6 metal panels, 12 ×12 glass panels, and 2.75 ×12 inch sections of select red oak and select maple flooring. One coat was applied, dried and sanded. Two more coats were applied to the conventional and water based coatings. Only one more coat was applied to the high solids coating. The panels were allowed to cure 10 days at room temperature and 55% humidity.

The coatings were tested for dry time, pencil hardness (astm d3363), sward hardness (astm d2134), hoffman scratch (astm d2197), taber abrasion (d4060), crosshatch adhesion (d3359), and impact resistance (astm d2794). The results of these tests are given in tables 1–3.

TABLE 1

| Solvent based Urethane Coating Composition w/ VOC | Impact (in/lbs) | Pencil | Cross-hatch | Sward (rocks) | Taber (1 kg) | Scratch | Wt. % Solids | Dry time |
|---|---|---|---|---|---|---|---|---|
| Metal panel | | | | | | | | |
| Gloss | > 130 | N/A | N/A | 6 | 169.2 | N/A | 61 | 6:00 |
| Gloss $Al_2O_3$ | > 130 | N/A | N/A | 7 | 110.0 | N/A | 62 | 5:15 |
| Semi gloss | 75 | N/A | N/A | 8 | 70.2 | N/A | 61.8 | >6:00 |
| Semi gloss $Al_2O_3$ | 100 | N/A | N/A | 9 | 67.2 | N/A | 62.9 | 4:45 |
| Satin | 80 | N/A | N/A | 8 | 89.2 | N/A | 62.5 | >6:00 |
| Satin $Al_2O_3$ | 80 | N/A | N/A | 9 | 54.6 | N/A | 63.3 | 4:30 |
| Red Oak | | | | | | | | |
| Gloss | 40 | 3B | 5B | 8 | N/A | 600 | N/A | |
| Gloss $Al_2O_3$ | 30 | 2B | 5B | 9 | N/A | 800 | N/A | |
| Semi gloss | 40 | 2B | 5B | 10 | N/A | 900 | N/A | |
| Semi gloss $Al_2O_3$ | 25 | HB | 5B | 11 | N/A | 1000 | N/A | |
| Satin | 30 | 2B | 5B | 8 | N/A | 700 | N/A | |
| Satin $Al_2O_3$ | 25 | HB | 5B | 9 | N/A | 800 | N/A | |
| Maple | | | | | | | | |
| Gloss | 30 | 3B | 5B | 9 | N/A | 800 | N/A | |
| Gloss $Al_2O_3$ | 30 | 2B | 5B | 10 | N/A | 900 | N/A | |
| Semi gloss | 20 | 2B | 5B | 10 | N/A | 800 | N/A | |
| Semi gloss $Al_2O_3$ | 25 | HB | 5B | 11 | N/A | 1000 | N/A | |
| Satin | 25 | 4B | 5B | 9 | N/A | 700 | N/A | |
| Satin $Al_2O_3$ | 25 | HB | 5B | 10 | N/A | 1000 | N/A | |

TABLE 2

| Solvent based Urethane Coating System | Impact (in/lbs) | Pencil | Cross-hatch | Sward (rocks) | Taber (1 kg) | Scratch | Wt. % Solids | Dry time |
|---|---|---|---|---|---|---|---|---|
| Metal Panel | | | | | | | | |
| Gloss | 90 | N/A | N/A | 20 | 51.1 | 500 | 42.4 | 1:15 |
| Gloss $Al_2O_3$ | 100 | N/A | N/A | 22 | 43.1 | 800 | 42.8 | 0:50 |
| Semi gloss | 80 | N/A | N/A | 19 | 43.2 | 300 | 41.8 | 1:10 |
| Semi gloss $Al_2O_3$ | 105 | N/A | N/A | 20 | 43.0 | 600 | 42.2 | 0:45 |
| Satin | 65 | N/A | N/A | 18 | 58.6 | 400 | 42.5 | 1:10 |
| Satin $Al_2O_3$ | 105 | N/A | N/A | 19 | 44.4 | 600 | 43.1 | 0:45 |
| Red Oak | | | | | | | | |
| Gloss | 25 | 3H | 5B | 17 | N/A | 500 | N/A | N/A |
| Gloss $Al_2O_3$ | 25 | 4H | 5B | 18 | N/A | 600 | N/A | N/A |
| Semi gloss | 20 | 3H | 5B | 13 | N/A | 700 | N/A | N/A |
| Semi gloss $Al_2O_3$ | 25 | 4H | 5B | 17 | N/A | 800 | N/A | N/A |
| Satin | 25 | 4H | 5B | 14 | N/A | 500 | N/A | N/A |

TABLE 2-continued

| Solvent based Urethane Coating System | | | | | | | | |
|---|---|---|---|---|---|---|---|---|
| | Impact (in/lbs) | Pencil | Cross-hatch | Sward (rocks) | Taber (1 kg) | Scratch | Wt. % Solids | Dry time |
| Satin $Al_2O_3$ | 20 | 4H | 5B | 17 | N/A | 600 | N/A | N/A |
| Maple | | | | | | | | |
| Gloss | 25 | 3h | 5b | 19 | N/A | 500 | N/A | N/A |
| Gloss $Al_2O_3$ | 20 | 4H | 5B | 22 | N/A | 600 | N/A | N/A |
| Semi gloss | 20 | 3H | 5B | 13 | N/A | 700 | N/A | N/A |
| Semi gloss $Al_2O_3$ | 20 | 4H | 5B | 19 | N/A | 800 | N/A | N/A |
| Satin | 25 | 3H | 5B | 15 | N/A | 500 | N/A | N/A |
| Satin $Al_2O_3$ | 20 | 4H | 5B | 18 | N/A | 700 | N/A | N/A |

TABLE 3

| Water based Acrylic-Urethane Coating System | | | | | | |
|---|---|---|---|---|---|---|
| | Impact (in/lbs) | Pencil | Cross-hatch | Sward (rocks) | Taber (1 kg) | Scratch |
| Metal Panel | | | | | | |
| Gloss | 35 | N/A | N/A | 16 | 100.4 | 500 |
| Gloss $Al_2O_3$ | 30 | N/A | N/A | 19 | 70.8 | 600 |
| Semi gloss | 20 | N/A | N/A | 16 | 95.4 | 600 |
| Semi gloss $Al_2O_3$ | 15 | N/A | N/A | 18 | 76.3 | 700 |
| Satin | 15 | N/A | N/A | 15 | 101.6 | 700 |
| Satin $Al_2O_3$ | 15 | N/A | N/A | 17 | 86.3 | 800 |
| No 1 Red Oak | | | | | | |
| Gloss | 30 | 4H | 5B | 12 | N/A | 300 |
| Gloss $Al_2O_3$ | 25 | 4H | 5B | 13 | N/A | 500 |
| Semi gloss | 25 | 4H | 5B | 11 | N/A | 300 |
| Semi gloss $Al_2O_3$ | 20 | 4H | 5B | 13 | N/A | 500 |
| Satin | 30 | 3H | 5B | 10 | N/A | 300 |
| Satin $Al_2O_3$ | 25 | 3H | 5B | 12 | N/A | 500 |
| Maple | | | | | | |
| Gloss | 25 | 4H | 5B | 15 | N/A | 400 |
| Gloss $Al_2O_3$ | 25 | 4H | 5B | 17 | N/A | 400 |
| Semi gloss | 25 | 4H | 5B | 13 | N/A | 300 |
| Semi gloss $Al_2O_3$ | 20 | 4H | 5B | 14 | N/A | 500 |
| Satin | 30 | 4H | 5B | 12 | N/A | 400 |
| Satin $Al_2O_3$ | 25 | 4H | 5B | 13 | N/A | 600 |

Although the invention has been described with reference to the exemplary embodiments, various changes and modifications can be made without departing from the scope and spirit of the invention. These modifications are intended to fall within the scope of the invention, as defined by the following claims.

We claim:

1. A coating composition comprising a urethane polymer, a hydrocarbon solvent, and fumed alumina.

2. The composition of claim 1 wherein the coating composition includes water.

3. The composition of claim 1 wherein said coating composition comprises a total solids weight between about 15 and 80 wt %.

4. The composition of claim 1 further comprising one or more additives chosen from the group consisting of coalescing aids, crosslinkers, silica, thickeners, freeze thaw agents, surfactants, defoamers, biocides, preservatives, flow control agents, dispersants, surface driers, through driers, antiskinning agents, and mixtures thereof.

5. The composition of claim 1 wherein said fumed alumina has a density between about 40 and 150 $g/cm^3$.

6. The composition of claim 1 wherein said fumed alumina comprises between about 0.1 and 5 wt % of the coating composition.

7. The composition of claim 1 wherein the fumed alumina has a particle size of less than about 1 $\mu$m.

8. The composition of claim 6 in which the coalescing aid comprises a glycol ether, the crosslinker comprises epoxy silanes, amino silanes or aziridine derivatives, the freeze thaw agent comprises ethylene glycol, diethylene glycol, propylene glycol or mixtures thereof, the surfactant comprises polyalkeneoxide modified polydimethylsiloxane, 2,4,7,9-tetramethyl-5-decyn-4,7-diol or sulfosuccinate, the defoamer comprises methylalkylpolysiloxane, the flow control agent comprises polyether modified dimethylpolysiloxane copolymer, the surface drier comprises cobalt or manganese solution, and the through drier comprises calcium, aluminum or zirconium solution.

9. A method for making a coating composition comprising combining a urethane polymer and fumed alumina in a hydrocarbon solvent.

10. A method for making a coating composition comprising combining a urethane polymer, an acrylic polymer and fumed alumina in water.

11. The method of claim 9 wherein said coating composition comprises a total solids weight between about 15 and 80 wt %.

12. The method of claim 9 further comprising mixing with the coating composition one or more additives chosen from the group consisting of coalescing aids, crosslinkers, silica, thickeners, freeze thaw agents, surfactants, defoamers, biocides, preservatives, flow control agents, dispersants, surface driers, through driers, antiskinning agents, and mixtures thereof.

13. The method of claim 9 wherein said fumed alumina has a density between about 40 and 150 g/cm$^3$.

14. The method of claim 9 wherein said fumed alumina comprises between about 0.1 and 5 wt % of the coating composition.

15. The method of claim 12 which the coalescing aid comprises a glycol ether, the crosslinker comprises epoxy silanes, amino silanes or aziridine derivatives, the freeze thaw agent comprises ethylene glycol, diethylene glycol, propylene glycol or mixtures thereof, the surfactant comprises polyalkeneoxide modified polydimethylsiloxane, 2,4,7,9-tetramethyl-5-decyn-4,7-diol or sulfosuccinate, the defoamer comprises methylalkylpolysiloxane, the flow control agent comprises polyether modified dimethylpolysiloxane copolymer, the surface drier comprises cobalt or manganese solution, and the through drier comprises calcium, aluminum or zirconium solution.

16. A method of finishing a wood floor comprising:

a. stripping an existing coating from the wood floor and/or sanding the wood floor, and b. the application of a coating composition comprising urethane polymers and fumed alumina to said wood floor.

17. The method of claim 16 wherein said application step b is repeated to increase finish thickness.

18. A coating composition comprising a urethane polymer, an acrylic polymer and a fumed alumina.

* * * * *